US009006607B2

(12) United States Patent
Ueda (10) Patent No.: US 9,006,607 B2
(45) Date of Patent: Apr. 14, 2015

(54) LIGHT BEAM SCANNING APPARATUS, LASER MACHINING APPARATUS, TEST METHOD AND LASER MACHINING METHOD

(75) Inventor: Shinji Ueda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1320 days.

(21) Appl. No.: 12/437,143

(22) Filed: May 7, 2009

(65) Prior Publication Data

US 2009/0289042 A1 Nov. 26, 2009

(30) Foreign Application Priority Data

May 22, 2008 (JP) ................................ 2008-134653

(51) Int. Cl.
*B23K 26/02* (2014.01)
*G02B 26/10* (2006.01)
*G02B 26/12* (2006.01)

(52) U.S. Cl.
CPC ............ *G02B 26/101* (2013.01); *G02B 26/105* (2013.01); *G02B 26/127* (2013.01)

(58) Field of Classification Search
CPC ...... B23K 26/02; B23K 26/023; G01B 11/26; G01B 9/02; G02B 6/3512; G02B 6/3504; G02B 7/16; G02B 7/1821; G02B 7/1822; G02B 7/198; G02B 26/0816; G02B 26/08; G02B 27/642
USPC ........... 219/121.67, 121.72, 121.82; 250/234, 250/236; 359/198.1, 199.1, 200.1, 212.1, 359/212.2, 226.1, 226.2; 356/138, 510
See application file for complete search history.

(56) References Cited

U.S. PATENT DOCUMENTS

| 4,694,164 | A | | 9/1987 | Noguchi |
| 5,898,495 | A | * | 4/1999 | Manning .................... 356/452 |
| 5,925,271 | A | * | 7/1999 | Pollack et al. ........... 219/121.74 |
| 6,467,345 | B1 | * | 10/2002 | Neukermans et al. ..... 73/504.02 |
| 6,541,732 | B2 | | 4/2003 | Hirose et al. ............... 219/121.7 |
| 6,703,603 | B2 | * | 3/2004 | Tohyama et al. ............. 250/234 |
| 2004/0212862 | A1 | * | 10/2004 | Toyama et al. ............... 359/196 |

FOREIGN PATENT DOCUMENTS

| EP | 1 316 831 | 6/2003 |
| JP | 60-221720 A | 11/1985 |
| JP | 61-116632 | 6/1986 |

(Continued)

OTHER PUBLICATIONS

Korean Office Action dated Dec. 3, 2010, in related corresponding Korean Patent Appln. No. 10-2009-0044236.

(Continued)

*Primary Examiner* — Brian Jennison
(74) *Attorney, Agent, or Firm* — Fitzpatrick, Cella, Harper & Scinto (57) ABSTRACT

A scanning apparatus for scanning a light beam includes a mirror configured to reflect an incident light beam, a motor configured to rotate the mirror to change a direction along which the light beam reflected by the mirror travels, and a detector configured to obtain a detection value corresponding to a tilt of a detected region of the mirror, with the detection value being changed in accordance with a rotation angle of the mirror. In addition, a processor is configured to obtain a tilt angle of the mirror based on the detection value obtained by the detector and the rotation angle of the mirror.

12 Claims, 11 Drawing Sheets

(56) References Cited

FOREIGN PATENT DOCUMENTS

| JP | 6-289305 | 10/1994 |
| JP | 2003-181660 A | 7/2003 |
| JP | 2004-354781 A | 12/2004 |
| JP | 2005-040843 A | 2/2005 |
| JP | 2006-338712 | 12/2006 |
| JP | 2009-258559 A | 11/2009 |

OTHER PUBLICATIONS

Japanese Office Action dated Jul. 2, 2012, in related Japanese Patent Application No. 2008-134653.

* cited by examiner

LIGHT BEAM SCANNING APPARATUS, LASER MACHINING APPARATUS, TEST METHOD AND LASER MACHINING METHOD

BACKGROUND OF THE INVENTION

1. Field of the Invention

The present invention relates to a light beam scanning apparatus, a laser machining apparatus including it, a test method for testing a light beam scanning apparatus, and a laser machining method.

2. Description of the Related Art

Light beam scanning apparatuses (galvano apparatuses) are used in machine tools such as laser drilling apparatuses, laser trimmer apparatuses, and laser repair apparatuses. A galvano apparatus has a mirror mounted on the rotation axis of a motor and causes the mirror to reflect laser light toward a target position while controlling the rotation angle of the mirror. In order to accurately set the irradiation position of laser light to a target position, it is necessary to accurately control the rotation angle of the mirror. It is possible to use an electrostatic capacitance sensor or an optical or magnetic encoder to detect the rotation angle of the mirror.

Since a machine tool is also required to operate at high speed, it is necessary to rotate/drive the mirror of a galvano apparatus at high speed. If, however, the dynamic balance between the mirror and the rotation axis of the motor is poor or the force generated by the magnet and coil of the motor contains components other than those in the rotating direction, vibration is excited in the motor in a tilt direction relative to the rotation axis of the motor. It is conventionally known that dynamic balance adjustment is performed for the rotation axis to suppress vibration in the motor (Japanese Patent Laid-Open No. 61-116632).

A detector which detects the rotation angle of the mirror of a conventional light beam scanning apparatus cannot detect vibration in a tilt direction. As a consequence, a product is machined in the presence of the vibration, and hence a machining failure can occur.

SUMMARY OF THE INVENTION

The present invention suppresses deteriorations in the positioning accuracy of process light and the process accuracy of a product due to, for example, mirror tilting.

The first aspect of the present invention provides an apparatus for scanning a light beam, the apparatus comprising a mirror configured to reflect an incident light beam, a motor configured to rotate the mirror to change a direction along which the light beam reflected by the mirror travels, a detector configured to detect tilt of a detected region of the mirror with respect to a rotation angle of the mirror, and a processor configured to calculate an amount of tilt of the mirror with respect to a direction along a rotation axis of the motor, based on the rotation angle of the mirror and the tilt of the detected region detected by the detector.

The second aspect of the present invention provides a laser machining apparatus comprising the apparatus defined as the first aspect of the present invention, and a laser apparatus configured to irradiate the mirror of the apparatus with laser light, wherein an irradiation position of laser light on a work to be machined is controlled by a rotation angle of the mirror.

The third aspect of the present invention provides a test method for an apparatus for scanning a light beam, the apparatus including a mirror configured to reflect an incident light beam, and a motor configured to rotate the mirror to change a direction along which the light beam reflected by the mirror travels, the method comprising steps of measuring a rotation angle of the mirror, detecting tilt of a detected region of the mirror with respect to the rotation angle, and obtaining an amount of tilt of the mirror with respect to a direction along a rotation axis of the motor, based on the rotation angle of the mirror and the tilt of the detected region.

The fourth aspect of the present invention provides a laser machining method comprising steps of obtaining an amount of tilt of the mirror by the test method defined as the third aspect of the present invention, and machining a work to be machined by irradiating the work with the laser after the amount of tilt of the mirror falls within an allowable value.

Further features of the present invention will become apparent from the following description of exemplary embodiments with reference to the attached drawings.

DESCRIPTION OF THE EMBODIMENTS

The preferred embodiments of the present invention will be described below with reference to the accompanying drawings.

[First Embodiment]

Figure 1:
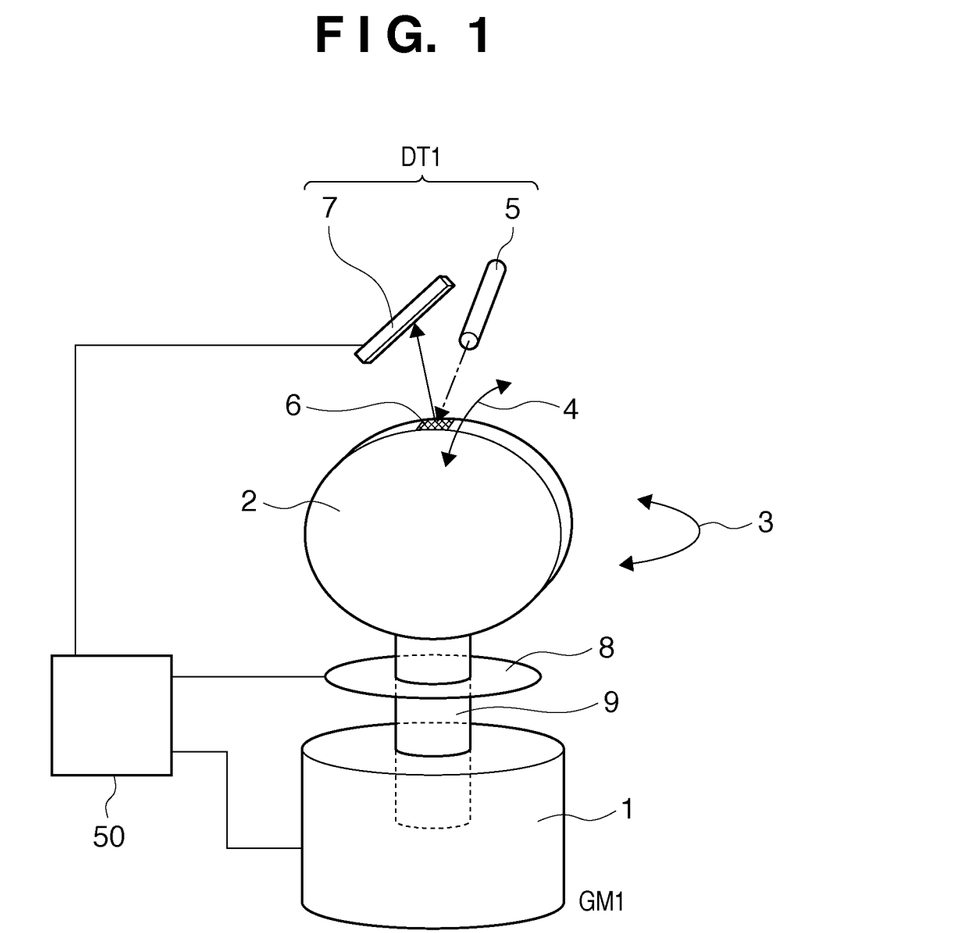
FIG. 1 is a view schematically showing the arrangement of a light beam scanning apparatus according to the first embodiment of the present invention.

FIG. 1 is a view schematically showing the arrangement of a light beam scanning apparatus which scans a light beam according to the first embodiment of the present invention. A light beam scanning apparatus GM1 according to the first embodiment of the present invention includes a mirror 2, a motor (rotation motor) 1, a detector DT1, and a processor 50. The motor 1 rotates the mirror 2 to change the direction along which the light beam reflected by the mirror 2 travels. The detector DT1 detects the tilt of a detected region 6 of the mirror 2 with respect to the rotation angle of the mirror 2. The processor 50 calculates the angle of tilt (the amount of tilt) of the mirror 2 with respect to a direction along the rotation axis of the motor 1, based on the tilt of the detected region 6 detected by the detector DT1 and the rotation angle of the mirror 2.

The mirror 2 is mounted on a rotation axis 9 of the motor 1. The mirror 2 reflects the laser light beam irradiated from a laser apparatus (not shown) toward a work to be machined or another mirror. The motor 1 rotates the mirror 2 in a rotating direction 3. A rotary encoder (rotation detector) 8 detects the rotation angle of the mirror 2. The mirror 2 tilts in an axis tilt direction 4. A tilt means an inclination relative to the rotation axis direction of the motor 1.

In this embodiment, the processor 50 also serves as a control unit which controls the rotation angle of the mirror 2, and feedback-controls the motor 1 based on an output (rotation angle) from the rotary encoder 8 so as to set the rotation angle of the mirror 2 relative to a reference surface to a target rotation angle.

In this embodiment, the detector DT1 includes an irradiation unit 5 which irradiates the mirror 2 with detection light and a sensor 7 having a light receiving surface which receives the detection light reflected by the mirror 2. The detector DT1 detects the tilt of the detected region 6 of the mirror 2 based on the position at which the detection light strikes the light receiving surface. As the sensor 7, for example, a PSD (Position Sensitive Detector) is suitably used, which can detect the tilt of the detected region 6 based on the light reception position of detection light on the light receiving surface.

Figure 2:
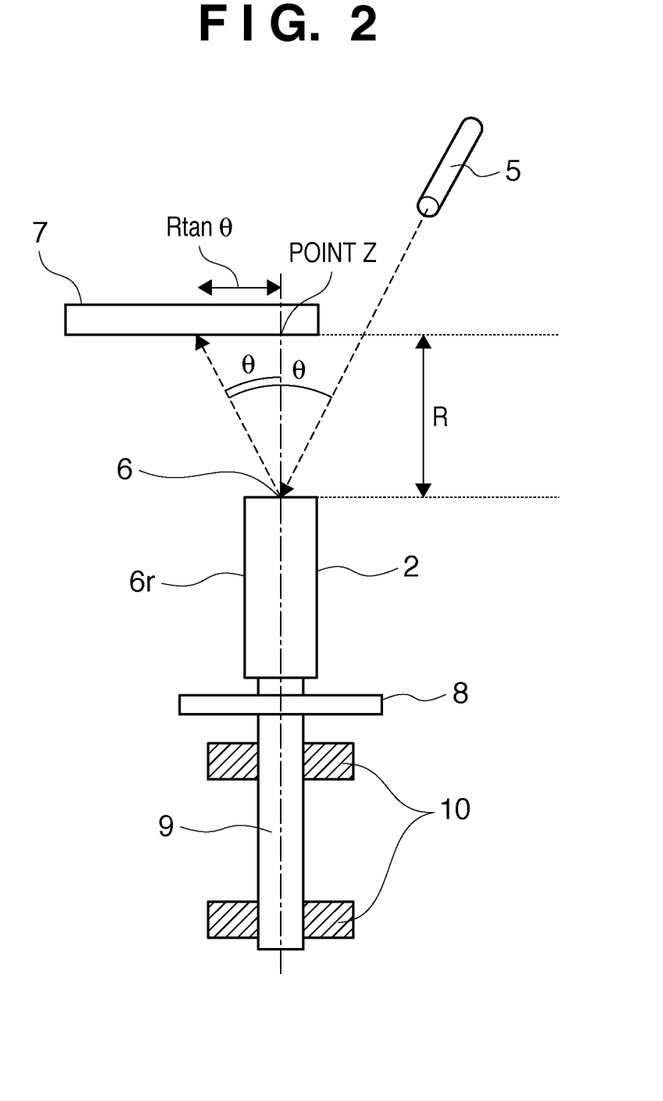
FIG. 2 is a view for explaining a principle of detecting the angle of tilt of a mirror in the first embodiment of the present invention.

FIG. 2 is a view for explaining a principle of detecting the angle of tilt (the amount of tilt) of the mirror 2. In this embodiment, a flat reflecting surface is formed as the detected region 6 on an upper portion of the mirror 2. Assume, for example, a case in which the reflecting surface as the detected region 6 is perpendicular to the rotation axis 9 of the motor 1.

Assume that the sensor 7 is a one-dimensional PSD. The sensor 7 is placed so as to be perpendicular to the rotation axis 9 of the motor 1 and a reflecting surface 6r of the mirror 2, which is used for laser machining. Letting $\theta$[rad] be the incident angle of detection light emitted from the irradiation unit 5 with respect to the detected region 6, the detection light is reflected by the detected region 6 at a reflection angle $\theta$[rad] and strikes the sensor 7.

Letting Z be the position at which the light receiving surface of the sensor 7 intersects an extended line of the rotation axis 9 of the motor 1 and R be the distance between the mirror 2 and the detected region 6, the incident position of detection light on the sensor 7 is spaced apart from the point Z by $R \cdot \tan \theta$.

Figure 3:
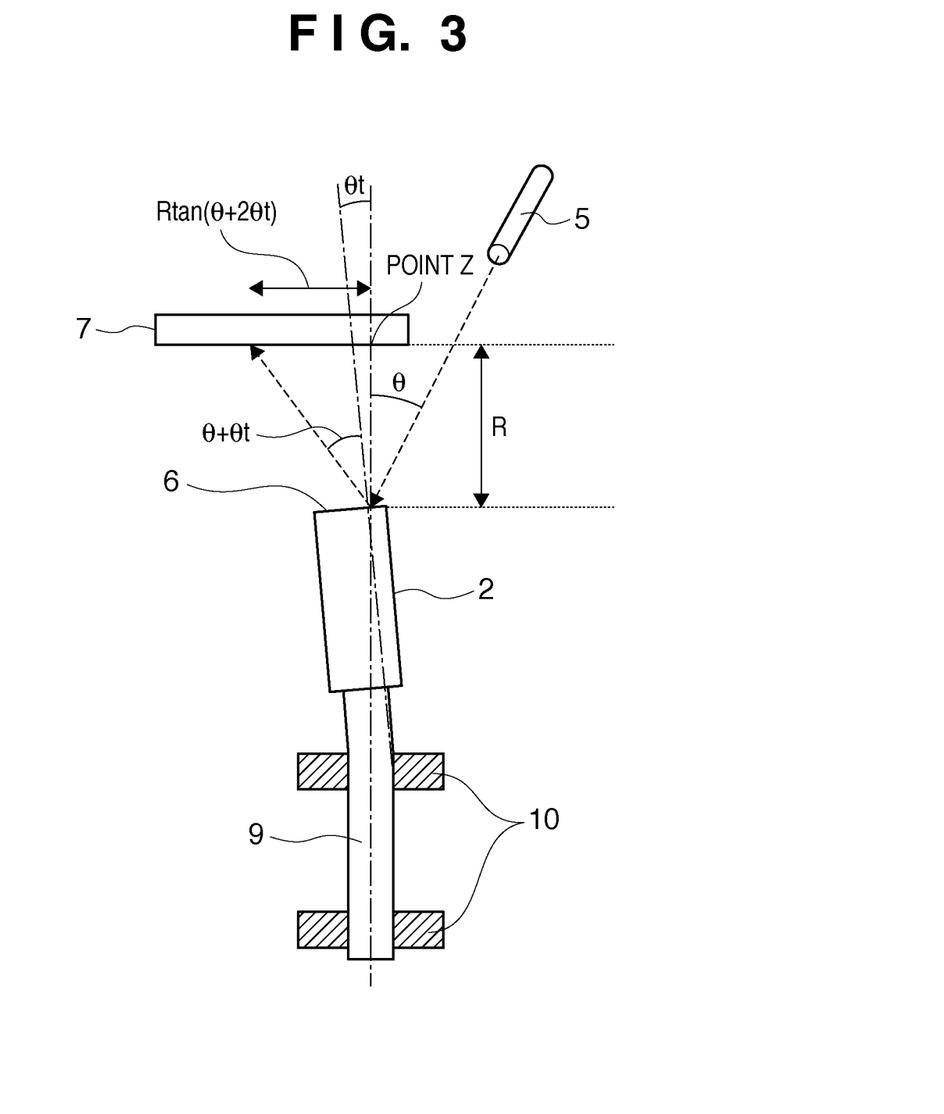
FIG. 3 is a view for explaining the principle of detecting the angle of tilt of the mirror in the first embodiment of the present invention.

FIG. 3 is a view showing a state in which a tilt corresponding to an angle $\theta t$[rad] has occurred in the mirror 2. The rotation axis 9 can be supported by a bearing 10. The bearing 10 supports a load in the radial direction. The inner ring of the bearing 10 is mounted on the rotation axis (so-called the rotor side) of the motor 1, and the outer ring of the bearing 10 is mounted on the case side (so-called stator side) of the motor 1.

The dominant vibration mode of vibration due to a tilt occurring in this arrangement originates from the tilt of the rotation axis 9 and mirror 2 with the bearing 10 serving as a fixed end. The incident angle of detection light on the detected region 6 is $\theta + \theta t$[rad], and the reflection angle of light is $\theta + \theta t$[rad]. At this time, the incident position of detection light on the light receiving surface of the sensor 7 is spaced apart from the point Z by $R \cdot \tan(\theta + 2\theta t)$.

Figure 4:
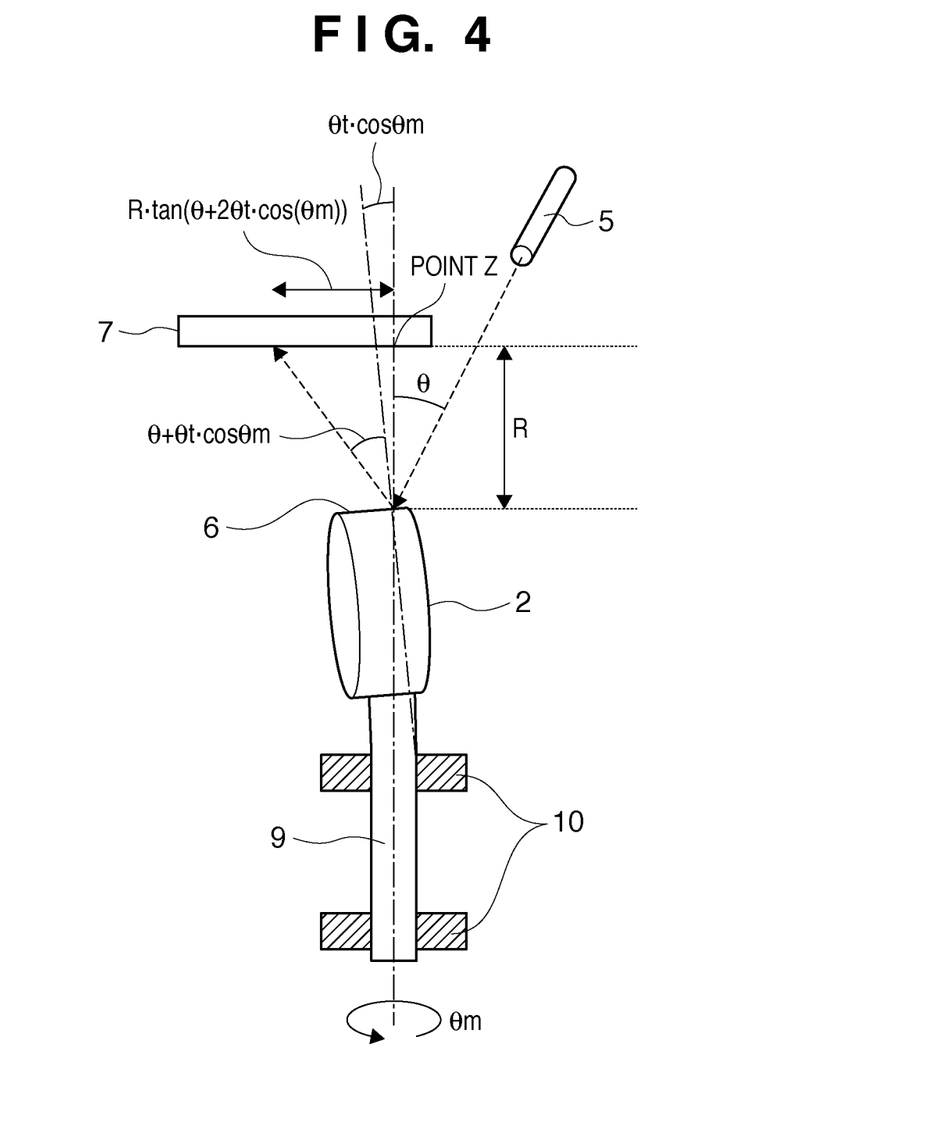
FIG. 4 is a view for explaining the principle of detecting the angle of tilt of the mirror in the first embodiment of the present invention.

FIG. 4 is a view showing a state in which the mirror 2 in the state shown in FIG. 3 is rotated through $\theta m$[rad] by the motor 1. When the mirror 2 is rotated through $\theta m$[rad], the incident angle of detection light on the detected region 6 becomes $\theta + \theta t \cdot \cos(\theta m)$ [rad]. The detection light is reflected at the reflection angle $\theta + \theta t \cdot \cos(\theta m)$[rad], and strikes the sensor 7. At this time, the incident position on the sensor 7 is spaced apart from the point Z by $R \cdot \tan(\theta + 2\theta t \cdot \cos(\theta m))$.

In this case, R and $\theta$ are design values, and hence are known. $\theta m$ can be detected by the rotary encoder 8.

The processor 50 therefore measures $R \cdot \tan(\theta + 2\theta t \cdot \cos(\theta m))$ and $R \cdot \tan \theta$ by using the detector DT1, and obtains an angle $\theta t$ of tilt (an amount of tilt) by computation based on the measured values. If the angle $\theta t$ of tilt (the amount of tilt) exceeds an allowable value, the processor 50 outputs an error signal representing the corresponding information.

Figure 5:
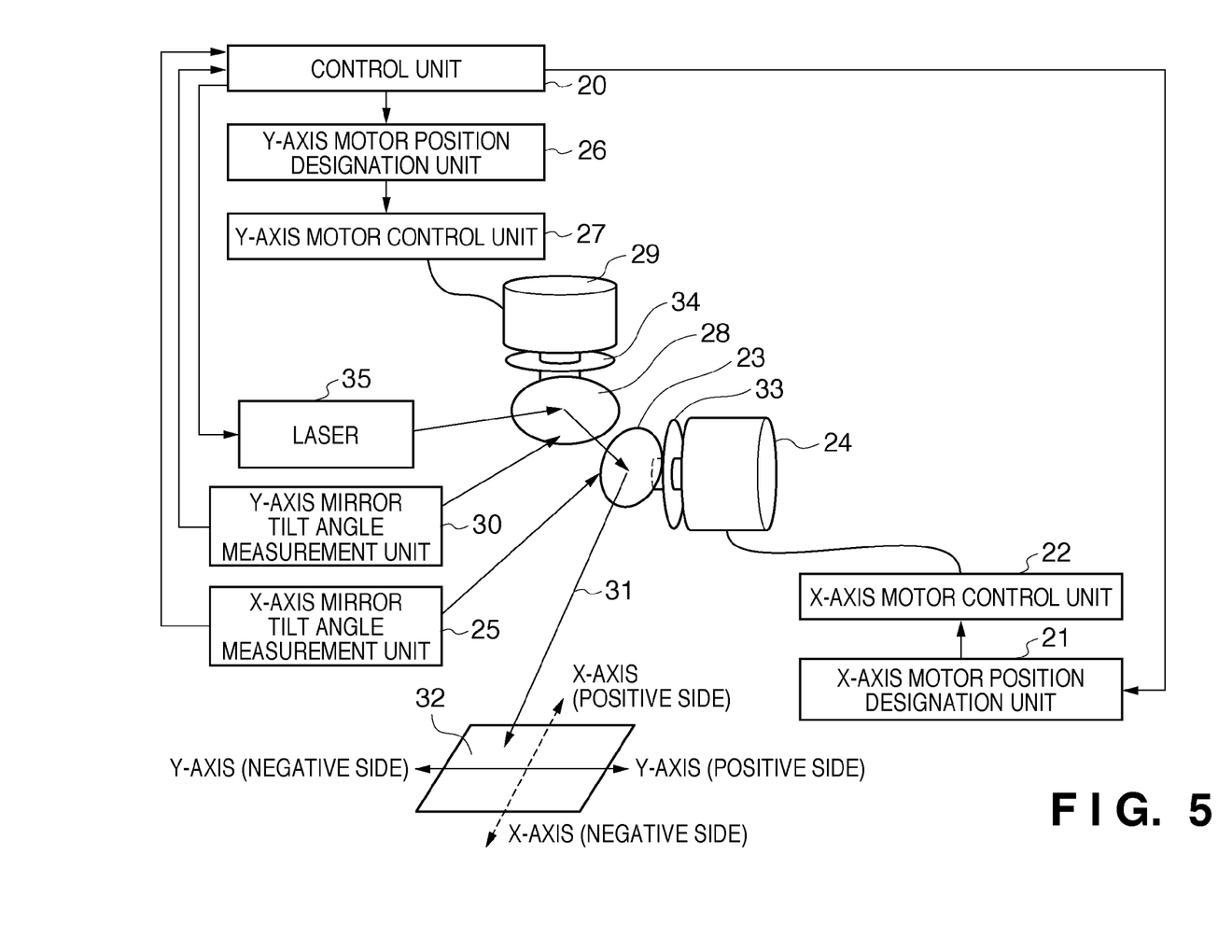
FIG. 5 is a view showing the arrangement of a laser machining apparatus according to a preferred embodiment of the present invention.

FIG. 5 shows an example of a laser machining apparatus incorporating the two light beam scanning apparatuses shown in FIG. 1. This laser machining apparatus can include an X-axis galvano unit (first galvano unit) which controls the X-axis direction position of laser light 31 irradiating a work 32 to be machined, a Y-axis galvano unit (second galvano unit) which controls the Y-axis direction position of the laser light 31, and a control unit 20. The X-axis and the Y-axis are based on an X-Y coordinate system, and are perpendicular to each other.

The X-axis galvano unit includes an X-axis mirror (first mirror) 23, an X-axis motor (first motor) 24 which rotates the X-axis mirror 23, and an X-axis mirror tilt angle measurement unit (first measurement unit) 25 which measures the angle of tilt (the amount of tilt) of the X-axis mirror 23. The X-axis mirror tilt angle measurement unit 25 includes components corresponding to the detector (first detector) DT1 described with reference to FIGS. 1 to 4 and a processor (first processor) 50. The X-axis galvano unit can further include an X-axis motor control unit 22 which controls the X-axis motor 24 and an X-axis motor position designation unit 21 which controls the X-axis direction position of laser light by designating a rotation angle to the X-axis motor 24.

The Y-axis galvano unit includes a Y-axis mirror (second mirror) 28, a Y-axis motor (second motor) 29 which rotates the Y-axis mirror 28, and a Y-axis mirror tilt angle measurement unit (second measurement unit) 30 which measures the angle of tilt (the amount of tilt) of the Y-axis mirror 28. The Y-axis mirror tilt angle measurement unit 30 includes components corresponding to the detector (second detector) DT1 described with reference to FIGS. 1 to 4 and a processor (second processor) 50. The Y-axis galvano unit can further include a Y-axis motor control unit 27 which controls the Y-axis motor 29 and a Y-axis motor position designation unit 26 which controls the Y-axis direction position of laser light by designating a rotation angle to the Y-axis motor 29. The rotation axis of the X-axis motor 24 and the rotation axis of the Y-axis motor 29 are perpendicular to each other. If the angle of tilt of the X-axis mirror 23 provided from the X-axis mirror tilt angle measurement unit 25 and the angle of tilt of the Y-axis mirror 28 provided from the Y-axis mirror tilt angle measurement unit 30 exceed allowable values, the control unit 20 waits until they fall within the allowable values. After both the angles of tilt fall within the respective allowable values, the control unit 20 controls a laser apparatus 35, the X-axis motor position designation unit 21, and the Y-axis motor position designation unit 26 so as to start or restart machining for the work 32.

When performing laser machining for the work 32, the control unit 20 designates the coordinates of a machining position (the irradiation position of laser light) on the work 32 with respect to the X-axis motor position designation unit 21 and the Y-axis motor position designation unit 26. The X-axis motor position designation unit 21 and the Y-axis motor position designation unit 26 convert the coordinates sent from the control unit 20 into the rotation angles of the X-axis mirror 23 and Y-axis mirror 28, and designate pieces of information representing the rotation angles with respect to the X-axis motor control unit 22 and the Y-axis motor control unit 27.

As the angular acceleration of a mirror is increased to improve the machining speed, the mirror tilts (or vibrates) when the driving of the mirror stopped. This tilt can remain for a considerable period of time. Therefore, as described above, waiting for the start or restart of machining for a work until the tilts of the mirrors fall within allowable values can reduce process failures on the work.

[Second Embodiment]

Figure 6:
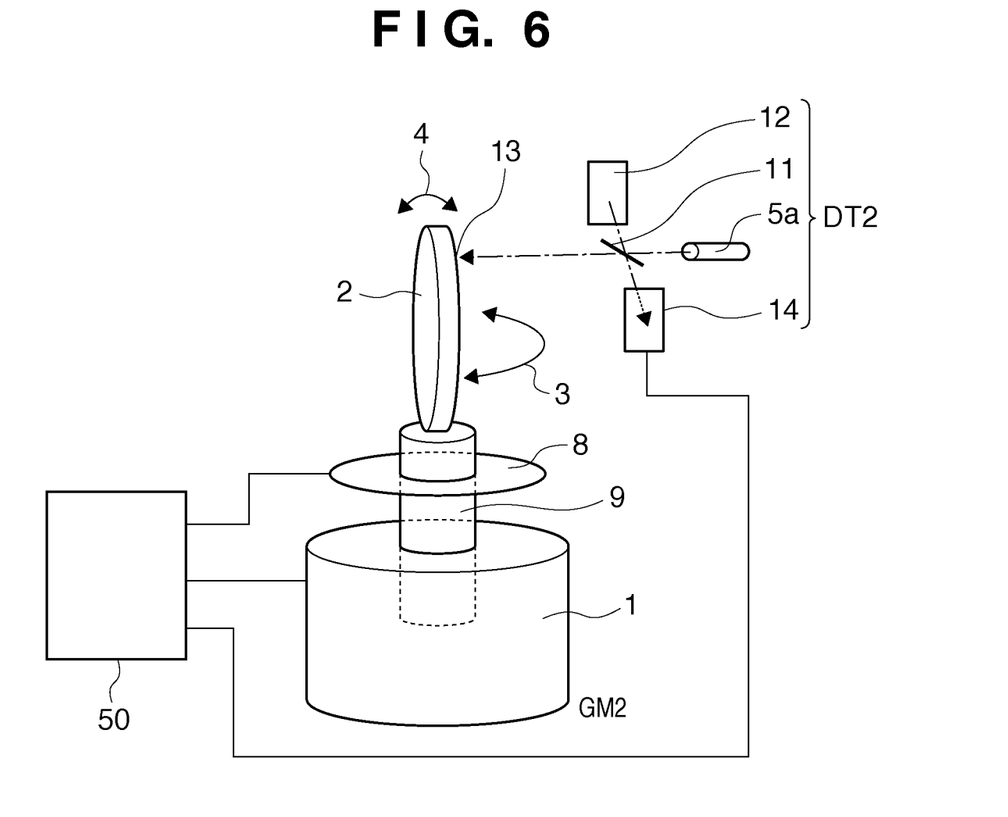
FIG. 6 is a view schematically showing the arrangement of a light beam scanning apparatus according to the second embodiment of the present invention.

FIG. 6 is a view schematically showing the arrangement of a light beam scanning apparatus according to the second embodiment of the present invention. A light beam scanning apparatus GM2 of the second embodiment is the same as that of the first embodiment except that the detector DT1 is replaced by a detector DT2. Any matter that is not described in the second embodiment can comply with the first embodiment.

The detector DT2 includes a displacement meter (displacement measurement device) formed by an interferometer, and detects the tilt of a detected region 13 of a mirror 2 by using the displacement meter. The detector DT2 includes a light source 5a, a half mirror 11, a mirror 12, and a sensor 14. Part of the light emitted from the light source 5a is transmitted through the half mirror 11 and is reflected by a reflecting surface which is the detected region 13 of the mirror 2. The reflected light is further reflected by the half mirror 11 and strikes the light receiving surface of the sensor 14. For example, the detected region 13 can be provided on the rear surface of the mirror 2. The other part of the light emitted from the light source 5a is reflected by the half mirror 11 and then the mirror 12. The reflected light is then transmitted through the half mirror 11 and strikes the light receiving surface of the sensor 14. The light reflected by the detected region 13 of the mirror 2 and the light reflected by the mirror 12 form an interference fringe pattern on the light receiving surface of the sensor 14. The sensor 14 then detects this interference fringe pattern. Such an interferometer is called a Michelson interferometer. Note that the detector DT2 can be formed by another type of interferometer.

Figure 7:
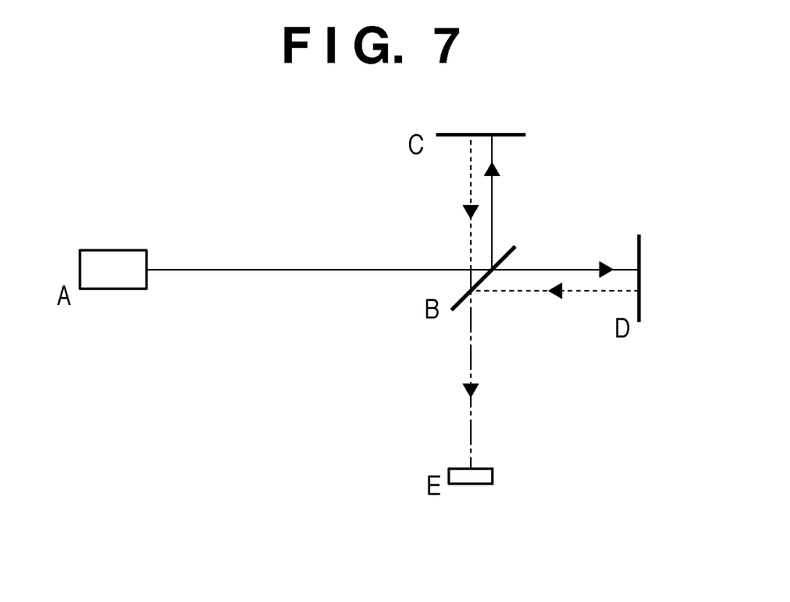
FIG. 7 is a view showing the arrangement of a general Michelson interferometer.

FIG. 7 is a view showing the arrangement of a general Michelson interferometer. A Michelson interferometer is known as a measurement device for measuring the displacement of a vibrating object. The light emitted from a light source A is split into first light transmitted through a half mirror B and second light reflected by the half mirror B. The first light transmitted through the half mirror B is reflected by a reflector (an object to be measured) D and is further reflected by the half mirror B to strike an observation point E. The second light reflected by the half mirror B is reflected by a reflector C and is transmitted through the half mirror B to strike the observation point E. The first light and the second light which strike the observation point E interfere with each other to form an interference fringe pattern. As the optical path lengths of the first light and second light change in accordance with the displacement of the reflector D, the interference fringe pattern changes. Detecting this change makes it possible to measure changes in optical path length, that is, the displacement of the reflector D.

Figure 8:
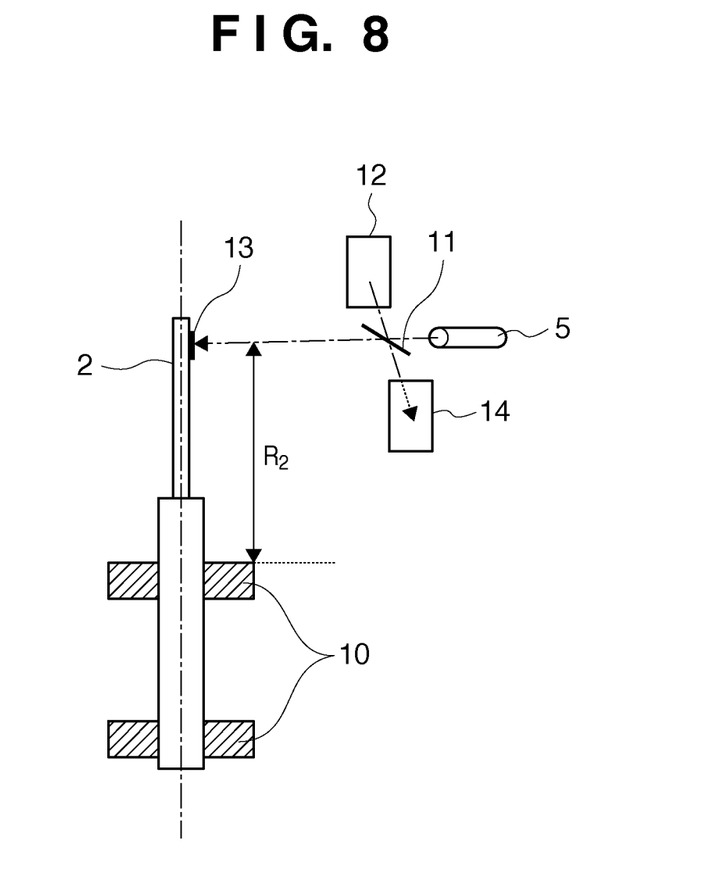
FIG. 8 is a view for explaining a principle of detecting the angle of tilt of a mirror in the second embodiment of the present invention.

FIG. 8 is a view for explaining the detection of the angle of tilt (the amount of tilt) of the mirror 2. Assume that while the mirror 2 has no tilt, the machining reflecting surface (the surface which reflects machining laser light) of the mirror 2 is perpendicular to the optical axis of the light source 5a. Light which strikes the reflecting surface as the detected region 13 which is provided on the rear surface of the mirror 2 so as to be parallel to the machining reflecting surface is reflected in the direction of the half mirror 11. Assume that the measured value (displacement amount) obtained by the interferometer (detector DT2) in this state is a reference value of 0.

Figure 9:
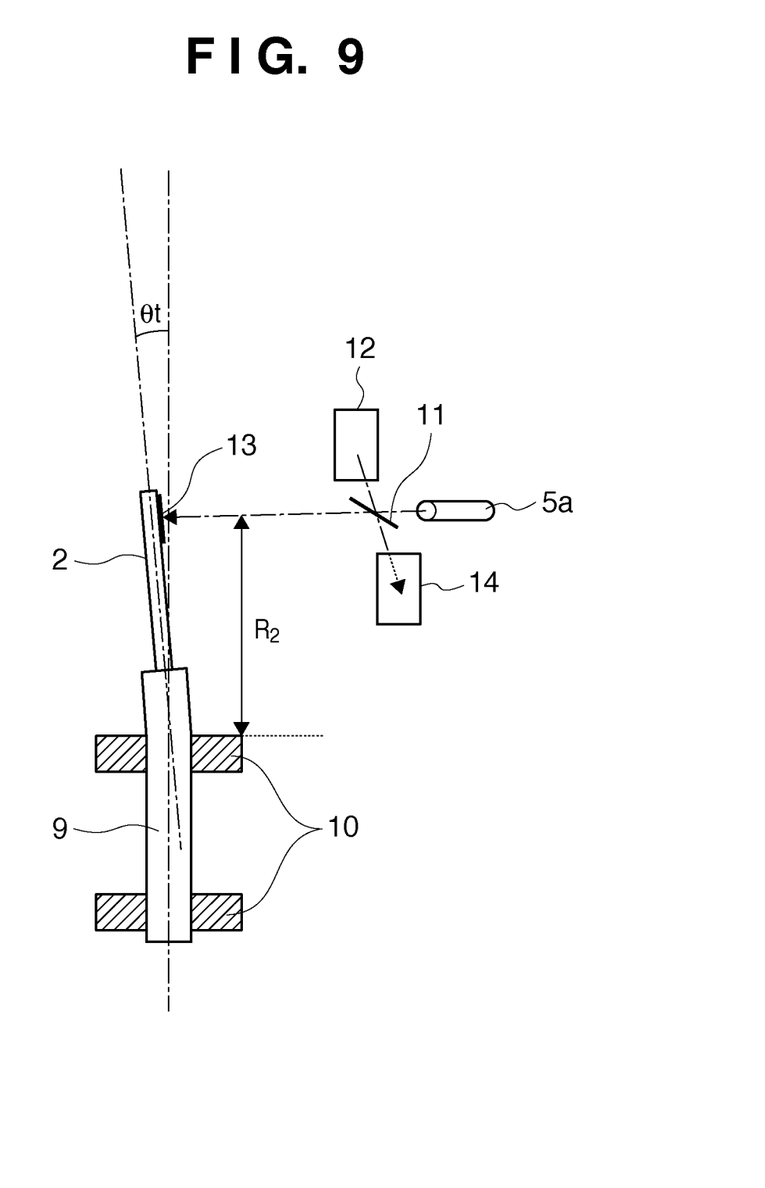
FIG. 9 is a view for explaining the principle of detecting the angle of tilt of the mirror in the second embodiment of the present invention.

FIG. 9 is a view showing a state in which the mirror 2 has tilted at the angle $\theta t$[rad]. In this state, the detected region 13 of the mirror 2 is spaced apart from the light source 5a by $R_2 \tan(\theta t)$. The interferometer (detector DT2) measures this displacement.

Figure 10:
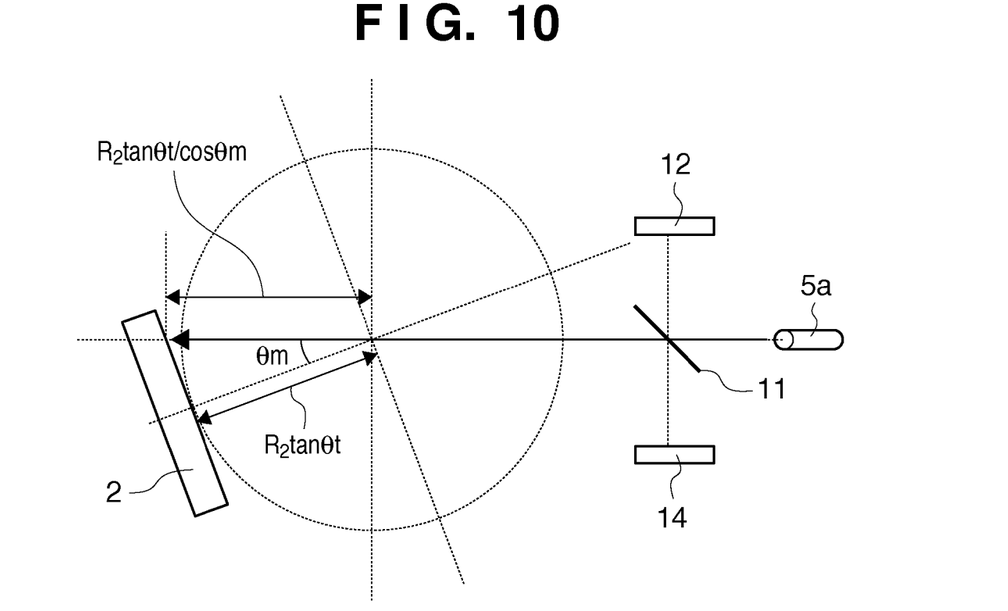
FIG. 10 is a view for explaining the principle of detecting the angle of tilt of the mirror in the second embodiment of the present invention.

FIG. 10 is a view showing a state in which the mirror 2 in the state shown in FIG. 9 is rotated through $\theta m$[rad] by the motor 1. When the mirror 2 is rotated through $\theta m$[rad], the detected region 13 is spaced apart from the light source 5a by $R_2 \tan(\theta t)/\cos(\theta m)$. The interferometer (detector DT2) measures this displacement.

In this case, reference symbol $R_2$ denotes the distance from a bearing 10 on the mirror 2 side to the detected region 13, which is a known value. A rotary encoder 8 can detect an angle $\theta m$. As the angle $\theta m$, a target rotation angle can be used.

By measuring the displacement amount calculated by the interferometer according to $R_2 \tan(\theta t)/\cos(\theta m)$, the processor 50 can compute an angle $\theta t$ of tilt (an amount of tilt).

The light beam scanning apparatus according to this embodiment can also incorporate a laser machining apparatus like that shown in FIG. 5. A control unit 20 of this laser machining apparatus waits until the angle of tilt of an X-axis mirror 23, provided from an X-axis mirror tilt angle measurement unit 25, and the angle of tilt of a Y-axis mirror 28, provided from a Y-axis mirror tilt angle measurement unit 30, fall within allowable values, respectively. After both the angles of tilt fall within the allowable values, the control unit 20 controls a laser apparatus 35, an X-axis motor position designation unit 21, and a Y-axis motor position designation unit 26 so as to start or restart machining for a work 32.

This embodiment has exemplified the detector to which a Michelson interferometer is applied. It is, however, possible to use, instead of this detector, for example, a laser Doppler velocimeter, laser Doppler vibration meter, or laser encoder.

[Third Embodiment]

Figure 11:
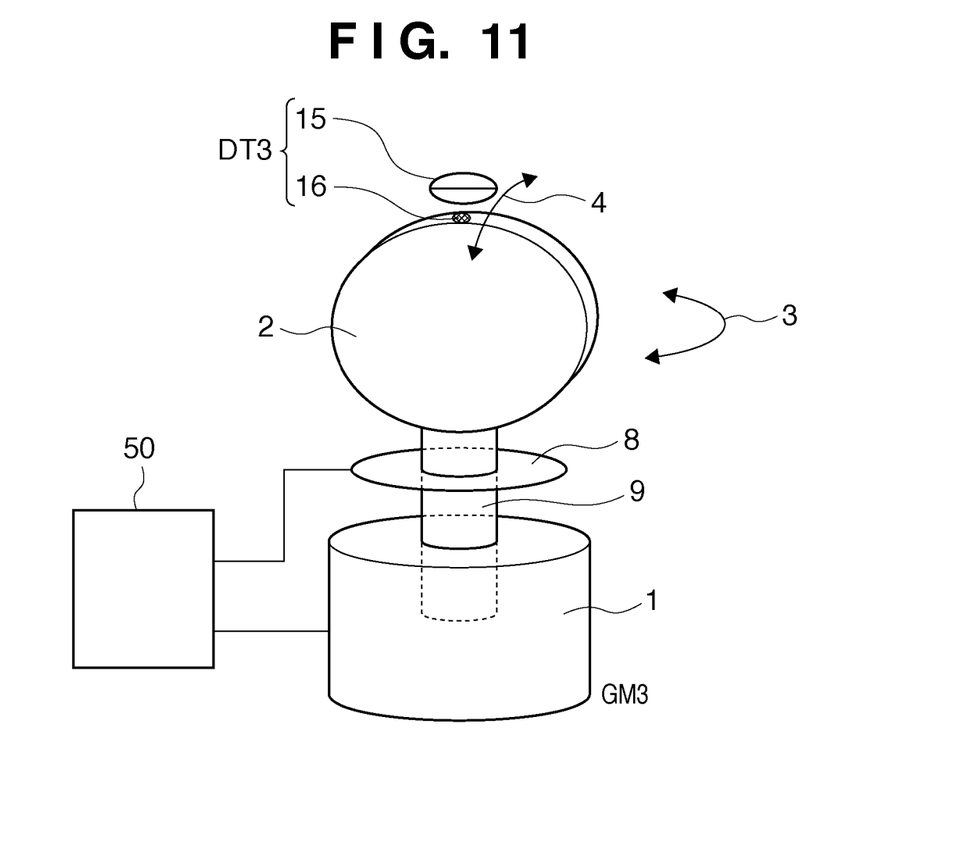
FIG. 11 is a view schematically showing the arrangement of a light beam scanning apparatus according to the third embodiment of the present invention.

FIG. 11 is a view schematically showing the arrangement of a light beam scanning apparatus according to the third embodiment of the present invention. A light beam scanning apparatus GM3 of the third embodiment is the same as that of the first embodiment except that the detector DT1 is replaced by a detector DT3. Any matter that is not described in the third embodiment can comply with the first embodiment.

The detector DT3 includes an electrostatic capacitance sensor, and detects the tilt of the detected region of a mirror 2 by using the electrostatic capacitance sensor. The detector DT3 includes a receiving electrode 16 mounted on the detected region of the mirror 2 and a split structure electrode 15 placed to face parallel to the receiving electrode 16. The split structure electrode 15 has, for example, a structure obtained by splitting a circular electrode into a pair of semicircular electrodes (split electrodes). The receiving electrode 16 and the split structure electrode 15 form a capacitance. When sine-wave electrical signals having a phase difference of ½ period are applied to the two semicircular electrodes, the receiving electrode 16 generates an electrical signal by capacitive coupling between the respective semicircular electrodes of the split structure electrode 15. The detector DT3 detects the angle of tilt (the amount of tilt) of the detected region of the mirror 2 by measuring this electrical signal.

Figure 12:
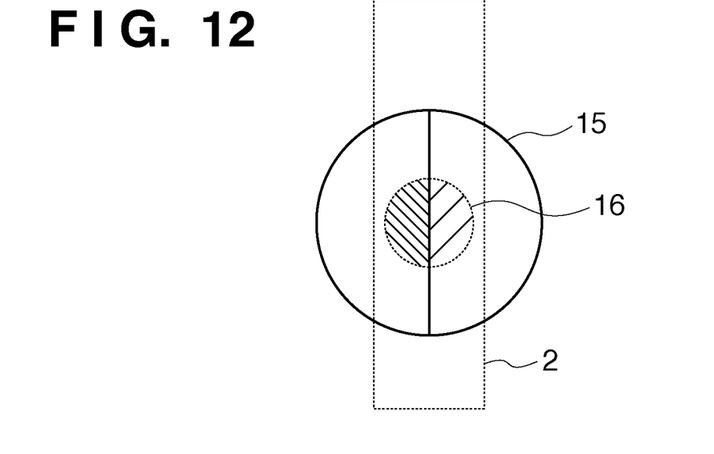
FIG. 12 is a view for explaining a principle of detecting the angle of tilt of a mirror in the third embodiment of the present invention.

FIG. 12 is a view for explaining the detection of the angle of tilt (the amount of tilt) of the mirror 2. FIG. 12 is a plan view of the arrangement shown in FIG. 11. While the mirror 2 has no tilt, the center of the receiving electrode 16 provided on the detected region of the mirror 2 coincides with the center of the split structure electrode 15. For this reason, as shown in FIG. 12, since the receiving electrode 16 overlaps the two semicircular electrodes of the split structure electrode 15 in the same manner, the intensity of the signal generated by the receiving electrode 16 becomes 0.

Figure 13:
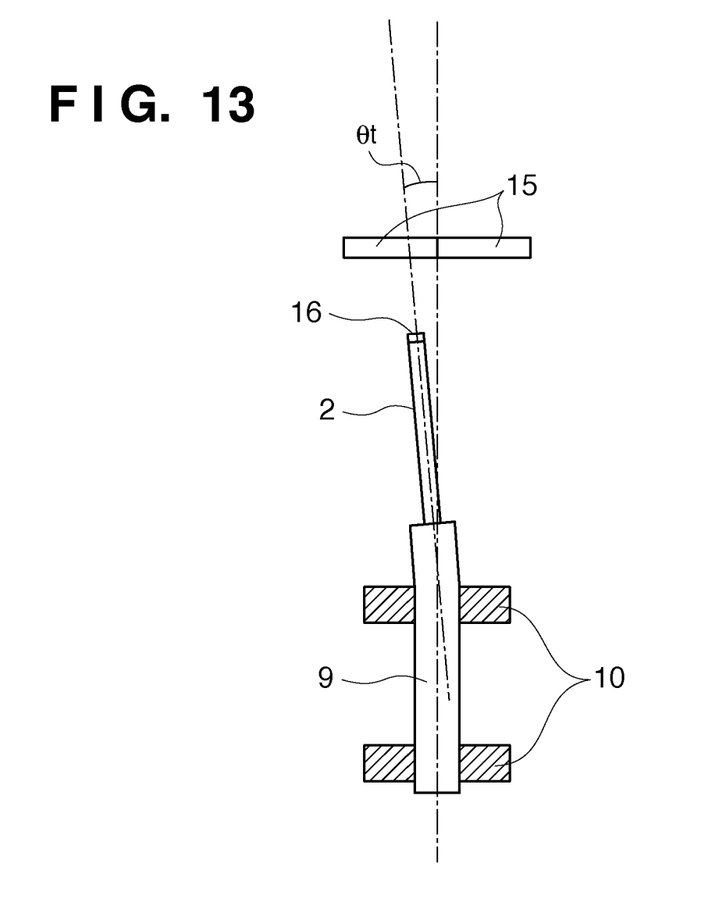
FIG. 13 is a view for explaining the principle of detecting the angle of tilt of the mirror in the third embodiment of the present invention.

FIG. 13 is a view showing a state in which the mirror 2 has tilted at the angle θt[rad]. A bearing 10 supports a load in the radial direction. The inner ring of the bearing 10 is mounted on the rotation axis (so-called the rotor side) of a motor 1, and the outer ring of the bearing 10 is mounted on the case side (so-called stator side) of the motor 1. The dominant vibration mode of vibration due to a tilt occurring in this arrangement originates from the tilt of a rotation axis 9 and the tilt of the mirror 2 with the bearing 10 serving as a fixed end. While the rotation axis 9 vibrates, that is, the mirror 2 tilts, the receiving electrode 16 is influenced more by one of the two semicircular electrodes of the split structure electrode 15 than by the other semicircular electrode at a given moment. For this reason, data representing the relationship between an angle θt of tilt of the mirror 2 and the signal generated by the receiving electrode 16 is registered in advance. This makes it possible to detect the angle θt of tilt (the amount of tilt) of the detected region of the mirror 2 based on the signal generated by the receiving electrode 16 and the registered data at the time of operation of the light beam scanning apparatus GM3.

As the mirror 2 is rotated through θm[rad] by the motor 1, the spatial arrangement of the receiving electrode 16 and split structure electrode 15 changes. For this reason, data representing the relationship between the angle θt of tilt of the detected region of the mirror 2 and the signal generated by the receiving electrode 16 with respect to the rotation angle θm is obtained in advance. At the time of operation of the light beam scanning apparatus GM3, the processor 50 can obtain the angle θt of tilt (the amount of tilt) of the detected region of the mirror 2 with respect to the rotation angle θm based on the signal generated by the receiving electrode 16 and the obtained data.

The light beam scanning apparatus of this embodiment can also incorporate a laser machining apparatus such as that shown in FIG. 5. A control unit 20 of this laser machining apparatus waits until the angle of tilt of an X-axis mirror 23, provided from an X-axis mirror tilt angle measurement unit 25, and the angle of tilt of a Y-axis mirror 28, provided from a Y-axis mirror tilt angle measurement unit 30, fall within allowable values, respectively. After both the angles of tilt fall within the allowable values, the control unit 20 controls a laser apparatus 35, an X-axis motor position designation unit 21, and a Y-axis motor position designation unit 26 so as to start or restart machining for a work 32.

[Fourth Embodiment]

Figure 14:
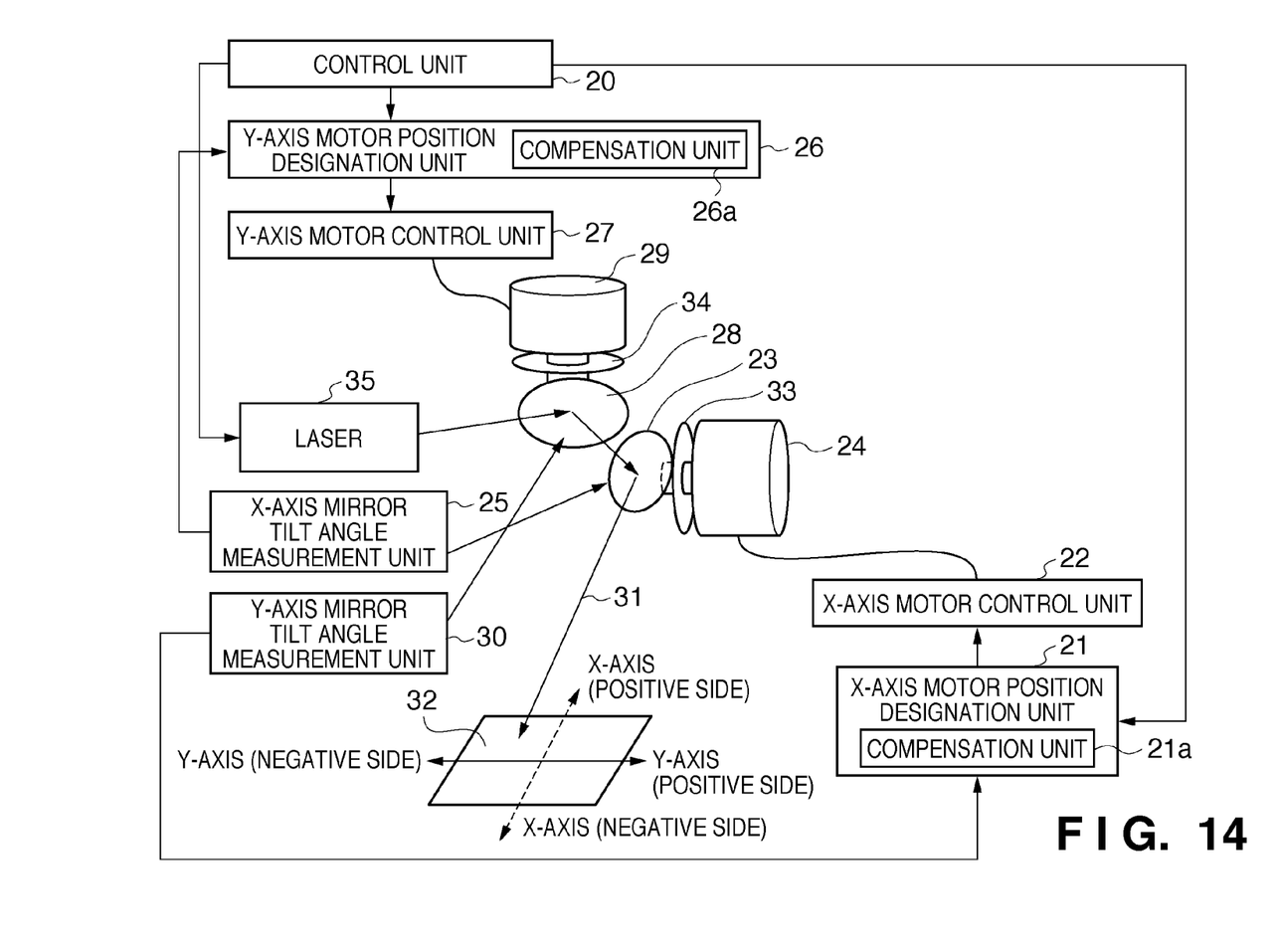
FIG. 14 is a view schematically showing the arrangement of a laser machining apparatus of the fourth embodiment of the present invention.

FIG. 14 is a view schematically showing the arrangement of a laser machining apparatus according to the fourth embodiment of the present invention. This laser machining apparatus can incorporate one of the light beam scanning apparatuses according to the first to third embodiments. This laser machining apparatus can include an X-axis galvano unit (first galvano unit) which controls the X-axis direction position of laser light 31 irradiating a work 32 to be machined, a Y-axis galvano unit (second galvano unit) which controls the Y-axis direction position of the laser light 31, and a control unit 20. The X-axis and the Y-axis are based on an X-Y coordinate system, and are perpendicular to each other.

The X-axis galvano unit includes an X-axis mirror 23, an X-axis motor 24 which rotates the X-axis mirror 23, and an X-axis mirror tilt angle measurement unit 25 which measures the angle of tilt (the amount of tilt) of the X-axis mirror 23. The X-axis mirror tilt angle measurement unit 25 includes components corresponding to one of the detectors DT1 to DT3 according to the first to third embodiments and a processor 50. The X-axis galvano unit can further include an X-axis motor control unit 22 which controls the X-axis motor 24 and an X-axis motor position designation unit 21 which controls the X-axis direction position of laser light by designating a rotation angle to the X-axis motor 24.

The Y-axis galvano unit includes a Y-axis mirror 28, a Y-axis motor 29 which rotates the Y-axis mirror 28, and a Y-axis mirror tilt angle measurement unit 30 which measures the angle of tilt (the amount of tilt) of the Y-axis mirror 28. The Y-axis mirror tilt angle measurement unit 30 includes components corresponding to one of the detectors DT1 to DT3 according to the first to third embodiments and the processor 50. The Y-axis galvano unit can further include a Y-axis motor control unit 27 which controls the Y-axis motor 29 and a Y-axis motor position designation unit 26 which controls the Y-axis direction position of laser light by designating a rotation angle to the Y-axis motor 29. The rotation axis of the X-axis motor 24 and the rotation axis of the Y-axis motor 29 are perpendicular to each other.

The tilt of the X-axis mirror 23 changes the position of the laser light 31, which strikes the work 32 to be machined, in the Y-axis direction perpendicular to the X-axis direction in which the laser light 31 is scanned by rotation of the X-axis mirror 23 by the X-axis motor 24. The tilt of the Y-axis mirror 28 changes the position of the laser light 31, which strikes the work 32 to be machined, in the X-axis direction perpendicular to the Y-axis direction in which the laser light 31 is scanned by rotation of the Y-axis mirror 28 by the Y-axis motor 29.

Therefore, rotating the Y-axis mirror 28 by the Y-axis motor 29 can compensate for the angle of tilt (the amount of tilt) of the X-axis mirror 23. In addition, rotating the X-axis mirror 23 by the X-axis motor 24 can compensate for the angle of tilt (the amount of tilt) of the Y-axis mirror 28.

When performing laser machining for the work 32, the control unit 20 designates the coordinates of a machining position (the irradiation position of laser light) on the work 32 with respect to the X-axis motor position designation unit 21 and the Y-axis motor position designation unit 26. The X-axis motor position designation unit 21 and the Y-axis motor position designation unit 26 convert the coordinates sent from the control unit 20 into the rotation angles of the X-axis mirror 23 and Y-axis mirror 28, and designates pieces of information representing the rotation angles to the X-axis motor control unit 22 and the Y-axis motor control unit 27.

The X-axis motor position designation unit 21 includes a compensation unit 21a. The compensation unit 21a corrects the rotation angle of the X-axis mirror 23, which is designated to the X-axis motor control unit 22, so as to compensate for the positional shift of the laser light 31 in the X direction due to the angle of tilt (the amount of tilt) of the Y-axis mirror 28 which is measured by the Y-axis mirror tilt angle measurement unit 30. The Y-axis motor position designation unit 26 includes a compensation unit 26a. The compensation unit 26a corrects the rotation angle of the Y-axis mirror 28, which is designated to the Y-axis motor control unit 27, so as to compensate for the positional shift of the laser light 31 in the Y direction due to the angle of tilt (the amount of tilt) of the X-axis mirror 23 which is measured by the X-axis mirror tilt angle measurement unit 25.

According to this embodiment, the shift of laser light due to the tilt of the X-axis mirror can be compensated by the rotation angle of the Y-axis mirror. The shift of laser light due to the tilt of the Y-axis mirror can be compensated by the rotation angle of the X-axis mirror. This makes it possible to process the work with high accuracy and at high speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-134653, filed May 22, 2008 which is hereby incorporated by reference herein in its entirety.

What is claimed is:

1. A scanning apparatus for scanning a light beam, the apparatus comprising:
   a mirror configured to reflect an incident light beam;
   a motor configured to rotate the mirror to change a direction along which a light beam reflected from the mirror travels, the motor including:
      a rotation axis the mirror being mounted at a first portion of the rotation axis; and
      a bearing supporting the rotation axis at a second portion of the rotation axis, the mirror being inclined via a tilt of the first portion of the rotation axis relative to the second portion of the rotation axis;
   a detector configured to obtain a detection value corresponding to a tilt of a detected region of the mirror, the detection value being changed in accordance with a rotation angle of the mirror; and
   a processor configured to obtain a tilt angle of the mirror based on the detection value and the rotation angle of the mirror, the tilt angle being an inclination of the mirror relative to a line parallel to the second portion of the rotation axis in a plane including the line and rotated with the mirror.

2. The apparatus according to claim 1, wherein the processor is configured, if the tilt angle exceeds an allowable value, to output an error signal representing that the tilt angle exceeds the allowable value.

3. The apparatus according to claim 1, wherein
   the mirror, the motor, the detector, and the processor constitute a first unit,
   the apparatus further comprises a second unit including:
      a second mirror configured to reflect an incident light beam;
      a second configured to rotate the second mirror to change a direction along which the light beam reflected by the second mirror travels, the second motor including:
         a second rotation axis the second mirror being mounted at a first portion of the second rotation axis; and
         a second bearing supporting the second rotation axis at a second portion of the second rotation axis, the second mirror being inclined via a tilt of the first portion of the second rotation axis relative to the second portion of the second rotation axis;
      a second detector configured to obtain a second detection value corresponding to a tilt of a detected region of the second mirror, the second detection value being changed in accordance with a rotation angle of the second mirror; and
      a second processor configured to obtain a tilt angle of the second mirror based on the second detection value and the rotation angle of the second mirror, the tilt angle of the second mirror being an inclination of the second mirror relative to a second line parallel to the second portion of the second rotation axis in a plane including the second line and rotated with the second mirror; and
   a compensation unit configured to compensate for the tilt angle of the mirror of the first unit by the rotation angle of the second mirror of the second unit, and to compensate for the tilt angle of the second mirror of the second unit by the rotation angle of the mirror of the first unit, wherein a first direction along which the light beam is scanned by the first unit is perpendicular to a second direction along which the light beam is scanned by the second unit.

4. The apparatus according to claim 1, wherein the detector includes an irradiation unit configured to irradiate the mirror with detection light, and a sensor having a light receiving surface which receives detection light reflected from the mirror, and is configured to obtain the detection value based on a position at which the reflected detection light strikes the light receiving surface.

5. The apparatus according to claim 1, wherein the detector includes an interferometer.

6. The apparatus according to claim 1, wherein the detector includes an electrostatic capacitance sensor.

7. A machining apparatus comprising:
   the scanning apparatus, defined in claim 1, for scanning the light beam; and
   an irradiation device configured to irradiate the mirror of the scanning apparatus with a light beam to generate the scanned light beam,
   wherein an irradiation position of the scanned light beam on a work to be machined is controlled by the rotation angle of the mirror.

8. The apparatus according to claim 7, further comprising a controller configured to stop machining for the work if the tilt angle of the mirror exceeds an allowable value.

9. The apparatus according to claim 7, further comprising a controller configured to cause the irradiation device to irradiate the mirror with a light beam after the tilt angle falls within an allowable value to machine the work by irradiating the work with the scanned light beam.

10. The apparatus according to claim 1, wherein
   the mirror, the motor, the detector, and the processor constitute a first unit,
   the apparatus further comprises a second unit including:
      a second mirror configured to reflect an incident light beam;
      a second configured to rotate the second mirror to change a direction along which the light beam reflected by the second mirror travels, the second motor including:

a second rotation axis the second mirror being mounted at a first portion of the second rotation axis; and
a second bearing supporting the second rotation axis at a second portion of the second rotation axis, the second mirror being inclined via a tilt of the first portion of the second rotation axis relative to the second portion of the second rotation axis; and
a compensation unit configured to compensate for the tilt angle of the mirror of the first unit by a rotation angle of the second mirror of the second unit, wherein
a first direction along which the light beam is scanned by the first unit is perpendicular to a second direction along which light beam is scanned by the second unit.

11. A scanning apparatus for scanning a light beam, the apparatus comprising:
a first mirror configured to reflect an incident light beam;
a first motor including a first rotation axis which mounts the first mirror and a first bearing for supporting the first rotation axis and configured to rotate the first mirror to change a direction along which a light beam reflected from the first mirror travels;
a first detector configured to obtain a first detection value corresponding to a tilt of a detected region of the first mirror, the first detection value being changed in accordance with a first rotation angle of the first mirror;
a first processor configured to obtain a first tilt angle of the first mirror based on the first detection value and the first rotation angle, the first tilt angle being an inclination of the first mirror relative to a line parallel to a portion of the first rotation axis at which the first rotation axis is supported by the first bearing;
a second mirror configured to reflect an incident light beam;
a second motor including a second rotation axis which mounts the second mirror and a second bearing for supporting the second rotation axis and configured to rotate the second mirror to change a direction along which the light beam reflected by the second mirror travels;
a second detector configured to obtain a second detection value corresponding to a tilt of a detected region of the second mirror, the second detection value being changed in accordance with a second rotation angle of the second mirror;
a second processor configured to obtain a second tilt angle of the second mirror based on the second detection value and the second rotation angle, the second tilt angle being an inclination of the second mirror relative to a line parallel to a portion of the second rotation axis at which the second rotation axis is supported by the second bearing; and
a compensation unit configured to compensate for the first tilt angle by the second rotation angle, and to compensate for the second tilt angle by the first rotation angle, wherein a first direction along which the light beam is scanned by the first mirror is perpendicular to a second direction along which light beam is scanned by the second mirror.

12. A scanning apparatus for scanning a light beam, the apparatus comprising:
a first mirror configured to reflect an incident light beam;
a first motor including a first rotation axis which mounts the first mirror and a first bearing for supporting the first rotation axis and configured to rotate the first mirror to change a direction along which a light beam reflected from the first mirror travels;
a detector configured to obtain a first detection value corresponding to a tilt of a detected region of the first mirror, the first detection value being changed in accordance with a first rotation angle of the first mirror;
a processor configured to obtain a first tilt angle of the first mirror based on the first detection value and the first rotation angle, the first tilt angle being an inclination of the first mirror relative to a line parallel to a portion of the first rotation axis at which the first rotation axis is supported by the first bearing;
a second mirror configured to reflect an incident light beam;
a second motor including a second rotation axis which mounts the second mirror and a second bearing for supporting the second rotation axis and configured to rotate the second mirror to change a direction along which the light beam reflected by the second mirror travels; and
a compensation unit configured to compensate for the first tilt angle by a second rotation angle of the second mirror, wherein
a first direction along which the light beam is scanned by the first mirror is perpendicular to a second direction along which light beam is scanned by the second mirror.

\* \* \* \* \*